(12) United States Patent
Holzmeier

(10) Patent No.: US 12,194,583 B2
(45) Date of Patent: Jan. 14, 2025

(54) EXTRACTION DEVICE FOR A CORE DRILL

(71) Applicant: Hilti Aktiengesellschaft, Schaan (LI)

(72) Inventor: Georg Holzmeier, Marktoffingen (DE)

(73) Assignee: Hilti Aktiengesellschaft, Schaan (LI)

( * ) Notice: Subject to any disclaimer, the term of this patent is extended or adjusted under 35 U.S.C. 154(b) by 764 days.

(21) Appl. No.: 17/270,509

(22) PCT Filed: Sep. 23, 2019

(86) PCT No.: PCT/EP2019/075498
§ 371 (c)(1),
(2) Date: Feb. 23, 2021

(87) PCT Pub. No.: WO2020/069893
PCT Pub. Date: Apr. 9, 2020

(65) Prior Publication Data
US 2021/0170537 A1   Jun. 10, 2021

(30) Foreign Application Priority Data

Oct. 1, 2018 (EP) .................................... 18197912

(51) Int. Cl.
*B23Q 11/00* (2006.01)
*B23B 47/34* (2006.01)
*E21B 25/10* (2006.01)

(52) U.S. Cl.
CPC .......... *B23Q 11/0046* (2013.01); *B23B 47/34* (2013.01); *B23Q 11/0071* (2013.01); *B23B 2260/058* (2013.01); *E21B 25/10* (2013.01)

(58) Field of Classification Search
CPC . B23Q 11/00; B23Q 11/0042; B23Q 11/0046; B23Q 11/005; B23Q 11/0057;
(Continued)

(56) References Cited

U.S. PATENT DOCUMENTS 1,985,157 A * 12/1934 Friedman ................ E21B 21/07
175/212
2,129,509 A *  9/1938 Smith .................... E21B 21/015
175/209

(Continued)

FOREIGN PATENT DOCUMENTS

CN   101184422 A   5/2008
CN   102176853 A   9/2011
(Continued)

OTHER PUBLICATIONS

JP-2008207288-A Machine Translation (Year: 2023).*
(Continued)

*Primary Examiner* — Nicole N Ramos
(74) *Attorney, Agent, or Firm* — Davidson Kappel LLC

(57) ABSTRACT

A description is given of an extraction device (1) for a core drill, including a housing (4) which has at least one cavity (7), a cover (2) and a wall (3) connected to the cover (2) around the periphery. An extraction nozzle (5) connected to the housing (4) is provided, designed for attaching the extraction device (1) to a suction device. The wall (3) has at least one inlet opening (44, 45), by way of which the cavity (7) is connected to the surroundings (U). A sealing device (50, 51), which can be moved between an inoperative position, lying substantially against the wall (3) of the housing (4), and an operative position, pivoted with respect to the inoperative position about a pivot axis (57, 58), is connected to the housing (4) on a side of the wall (3) that is facing away from the cavity (7).

21 Claims, 14 Drawing Sheets

(58) Field of Classification Search
CPC .............. B23Q 11/006; B23Q 11/0071; B23Q 11/0078; B23Q 11/06; B23Q 11/08; B23Q 11/0825; B23Q 11/0866; B23Q 11/0875; B23Q 11/0883; B23Q 11/0891; B23B 2231/28; B23B 2231/44; B23B 2260/058; B23B 2270/62; B23B 2251/68; B23C 2230/045; B23C 2230/08

See application file for complete search history.

(56) References Cited

U.S. PATENT DOCUMENTS

| | | | | |
|---|---|---|---|---|
| 2,634,952 | A * | 4/1953 | Brinkley | E21B 21/01 175/209 |
| 3,786,846 | A * | 1/1974 | Mehring | B23Q 11/0046 29/DIG. 86 |
| 4,088,164 | A * | 5/1978 | McCord, Jr. | B27C 5/04 29/DIG. 44 |
| 4,184,226 | A * | 1/1980 | Loevenich | B23Q 11/0067 408/67 |
| 5,381,842 | A * | 1/1995 | Aigner | B27C 5/04 409/137 |
| 5,395,015 | A * | 3/1995 | Bolen, Jr. | B65D 47/0895 D9/449 |
| 5,951,219 | A * | 9/1999 | Stadtfeld | B23F 17/003 409/137 |
| 6,299,393 | B1 * | 10/2001 | Anders | B23Q 11/0003 409/137 |
| 6,648,742 | B1 * | 11/2003 | Segiel, Jr. | B28D 7/02 83/100 |
| 6,712,162 | B2 | 3/2004 | Britz | |
| 7,290,967 | B2 * | 11/2007 | Steimel | B23Q 11/0046 409/137 |
| 8,911,186 | B2 * | 12/2014 | Hahn | B23Q 11/0046 409/137 |
| 11,149,504 | B2 * | 10/2021 | Goldspink | B01D 35/28 |
| 2004/0247407 | A1 * | 12/2004 | Tillemans | B25H 1/0064 409/137 |
| 2006/0207055 | A1 | 9/2006 | Ivarsson et al. | |
| 2007/0065242 | A1 * | 3/2007 | Skradski | B23Q 11/0046 408/67 |
| 2011/0131756 | A1 | 6/2011 | Curien | |
| 2012/0325557 | A1 | 12/2012 | Schneider et al. | |
| 2017/0225358 | A1 | 8/2017 | Carlsson et al. | |
| 2018/0015581 | A1 * | 1/2018 | Neale | B23Q 11/0046 |
| 2019/0251229 | A1 * | 8/2019 | Liu | G06F 30/00 |
| 2021/0347090 | A1 | 11/2021 | Holzmeier | |

FOREIGN PATENT DOCUMENTS

| | | | |
|---|---|---|---|
| CN | 202441289 | U | 9/2012 |
| CN | 104120988 | A | 10/2014 |
| CN | 206190244 | U | 5/2017 |
| CN | 206477807 | U | 9/2017 |
| CN | 107965284 | A | 4/2018 |
| CN | 112638610 | A | 4/2021 |
| DE | 4423670 | A1 | 1/1996 |
| DE | 29617319 | U1 | 2/1997 |
| DE | 19543599 | A1 | 5/1997 |
| EP | 1 193 026 | A1 | 4/2002 |
| EP | 2335868 | A2 | 6/2011 |
| JP | 2008207288 | A * | 9/2008 |
| JP | 2009241234 | A | 10/2009 |
| WO | WO 2012099509 | A1 | 7/2012 |
| WO | WO-2019035940 | A1 * | 2/2019 ......... B23Q 11/0046 |

OTHER PUBLICATIONS

International Search Report of PCT/EP2019/075498, dated Dec. 5, 2019.
US 2021/0347090 A1, Nov. 11, 2021, U.S. Appl. No. 17/270,631, filed Feb. 23, 2021.
US 2021/0170537 A1, Jun. 10, 2021, U.S. Appl. No. 17/270,509, filed Feb. 23, 2021.

\* cited by examiner

EXTRACTION DEVICE FOR A CORE DRILL

The present invention relates to an extraction device for a core drill.

BACKGROUND

In practice, there are known extraction devices that circumferentially enclose a core drill during a machining operation, so that drilling water that occurs when a core drilling operation is being carried out can be removed by way of the extraction device and contamination of the surroundings is prevented.

Since such an extraction device has a circumference that is in each case greater than the diameter of the core drilling tool, this has the effect for example of restricting whether core-drilled boreholes can be made in the region of corners of a space, and a minimum distance, dependent on the extraction device, from such hindrances is required.

SUMMARY OF THE INVENTION

It is an object of the present invention to provide an extraction device with which there is great freedom in the positioning of a core-drilled borehole, while as much drilling water as possible can be reliably removed by the extraction device from a core-drilled borehole under various spatial constraints.

An extraction device for a core drill is provided, comprising a housing which has at least one cavity, a cover and a wall connected to the cover around the periphery, wherein an extraction nozzle connected to the housing is provided, designed for attaching the extraction device to a suction device or a dust collector. It is proposed that the wall has at least one inlet opening, by way of which the cavity is connected to the surroundings, wherein a sealing device, which can be moved between an inoperative position, lying substantially against the wall of the housing, and an operative position, pivoted with respect to the inoperative position about a pivot axis, is connected to the housing on a side of the wall that is facing away from the cavity.

The extraction device is designed for being arranged completely radially outside the core drill, so that there is great freedom in the positioning of a core-drilled borehole and it is possible for core-drilled boreholes to be made even in a region near extremities, for example in the region of corners of a space, or near hindrances. Consequently, positioning of the core drill is not restricted by the extraction device. In the operating state of the extraction device, in which the extraction device is coupled to a suction device or a dust collector, the extraction device is sucked against the wall or on the floor by the negative pressure generated in the cavity by the suction device, in particular in a region near the core-drilled borehole to be made, and preferably stays in place without any further force being applied. In order to achieve this in an easy way, a side of the wall that is facing away from the cover preferably lies substantially in one plane completely around its periphery.

The drilling water that occurs during the core drilling is introduced into the cavity of the extraction device through the at least one inlet opening and is removed from it by the suction device by way of the extraction nozzle. Providing the at least one sealing device, designed in particular as a sealing panel or sealing strip, makes it possible in a structurally easy way to increase the size of a capturing region for the drilling water, so that a large proportion of the drilling water can be fed to the cavity of the suction device through the at least one inlet opening.

The fact that the sealing device can be moved between an inoperative position, lying substantially against the wall of the housing, and an operative position, pivoted with respect to the inoperative position about a pivot axis, means that, depending on the positioning with respect to a core drill and depending on the size of the core drilling diameter used, the sealing device can be easily set in each case in such a way that in the respective application as much of the drilling water as possible can be captured and fed to the at least one inlet opening. With the proposed extraction device, consequently, as much drilling water as possible can be reliably removed from a core-drilled borehole under various spatial constraints. By means of the sealing device, for example, a width of the extraction device that is effective for capturing drilling water can be increased in comparison with a design without a sealing device or with the sealing device in the inoperative position. If a core-drilled borehole is made for example in the region of a wall, sealing with respect to a lateral wall is possible for example by means of the sealing device, and drilling water can be prevented from running down on the lateral wall and not being collected by the extraction device.

The sealing device preferably has a substantially rectangular cross section, wherein in particular a longitudinal extent of the sealing device may vary depending on the application.

The sealing device is preferably pivotable between the inoperative position and the operative position about an angle of approximately 180°. As a result, the extraction device can be easily used for core drills with different core drilling diameters under various spatial constraints.

In order to easily prevent drilling water from passing through between the sealing device and the wall or the floor on which the extraction device is arranged in the operating state, the sealing device is preferably made from a flexible and/or elastic material, for example rubber, in particular nitrile rubber or ethylene-propylene-diene rubber, preferably with a Shore hardness of greater than 70. It may also be provided that the sealing device has a plastic part, which is in particular surrounded or encapsulated by a soft component, preferably of rubber.

The sealing device may be connected to the housing both fixedly, i.e. undetachably, and detachably, wherein the detachable arrangement has the advantage that the sealing device is easily exchangeable or can be easily replaced by a sealing device designed with different geometrical dimensions.

For easy attachment of the sealing device, it may be provided that the housing has a cylindrical fitting and the sealing device has a cylindrical recess corresponding to it, wherein an inside diameter of the recess is preferably smaller than an outside diameter of the fitting. The provision of an undersized connection makes it easily possible to ensure a secure hold of the sealing device in the respectively chosen position for use, for example by a tension that is provided in the rubber. The cylindrical fitting is preferably arranged in a lateral peripheral region of the housing, so that with the sealing device a region for capturing drilling water can be easily increased in size.

If a side of the sealing device that is facing a wall or a floor in the operative position of the extraction device is angled away from the fitting, as much surface pressure as desired of the sealing device with respect to the base material, i.e. the floor or the wall, can be achieved in a structurally easy way, so that good sealing with respect to the base material can be achieved. In this way, an advantageously large proportion of the drilling water can be captured.

In order to provide a capturing region for the drilling water that is as large as possible, the sealing device may be attached to the housing in a lateral peripheral region of the extraction device with respect to a transverse extent of the extraction device.

Preferably, two sealing devices are provided, attached to the housing in lateral peripheral regions of the extraction device facing away from one another. In this way, a capturing region for drilling water can be set particularly accurately by the sealing devices, and the great capturing width of the extraction device can be achieved.

In an advantageous design, it is provided that the wall has a first substantially planar wall region and a second substantially planar wall region, wherein a surface of the first wall region that is facing away from the cavity forms an obtuse angle with a surface of the second wall region that is facing away from the cavity The drilling water that occurs during the core drilling is introduced into the cavity of the extraction device through the at least one inlet opening and is removed from it by the suction device by way of the extraction nozzle. Providing the obtuse angle, which for example lies between 120° and 160° and is in particular approximately 140°, makes it possible to arrange the extraction device very near the core-drilled borehole to be made and to at least partially enclose the drill bit. In this way it is possible to extract a large proportion of the drilling water that occurs when making the core-drilled borehole. The extraction device is positioned on the wall during use in particular in such a way that the first wall region and the second wall region each run from a mutually facing region in an opposite direction in relation thereto upwardly with respect to a horizontal, so that gravitational force causes the drilling water to collect in a mutually facing region of the first wall region and the second wall region.

It has been found to be advantageous if the first wall region and the second wall region are connected to one another by means of a preferably planar third wall region.

The extraction device has a form that is conducive to removing a large amount of drilling water from the cavity if the wall has a fourth, in particular crescent-shaped or U-shaped, wall region, which is connected to the first wall region and to the second wall region.

In order to achieve favorable extraction of the drilling water introduced into the cavity, an extraction region that is in particular cylindrical and by which the extraction nozzle is in connection with the cavity may be arranged in the cavity. The extraction region is in particular arranged centrally in the housing, which is preferably designed mirror-symmetrically in relation to the extraction region. The extraction region preferably has a wall which extends from the cover into a plane that lies against the wall or the floor during the operation of the suction-attachment device.

In order to achieve as far as possible complete extraction of drilling water from the cavity in the event that the drilling water is not carried into a region near the extraction region by gravitational force during operation, at least one extraction channel may be provided, formed by the fourth wall region and a fifth wall region arranged substantially parallel to the fourth wall region, wherein the fifth wall region extends from the extraction region in particular up to a lateral peripheral region of the wall that is facing away from the extraction region. The fifth wall region is preferably connected to the cover and extends in particular up to a plane that lies against the wall or the floor during the operation of the suction-attachment device. As a result, the extraction channel by means of which drilling water is reliably transported out of a region remote from the extraction region in the direction of the extraction region by the flow effects achieved is formed by the fifth wall region and the fourth wall region. In order to be able to achieve favorable extraction of drilling water from the cavity, the extraction channel is preferably connected directly to the extraction region.

Extraction of drilling water from the cavity is particularly good if any spurious air streams during operation are as few as possible and as small as possible. This can be achieved by a contour that is as closed as possible of a wall of the extraction region that lies in particular on the base material during the operation of the extraction device.

In order to achieve an air flow of a speed of a desired level, required for good extraction of drilling water from the cavity, the extraction channel may have at least one element narrowing the flow cross section of the extraction channel.

It has been found that removal of drilling water from the cavity as well as desired is achieved if the extraction channel has a minimal cross section that is as small as possible, since as a result an air flow of a high speed can be achieved in the extraction channel when a suction device is connected to the extraction nozzle. This air flow of a high speed has the consequence that drilling water present in the cavity is entrained because of the Venturi effect and, given an appropriate design, can also be entrained against gravitational force. The minimal cross section of the extraction channel lies for example between 30 mm$^2$ and 45 mm$^2$, preferably at approximately 37.5 mm$^2$.

Preferably, the housing has three inlet openings, by way of which drilling water can be fed to the cavity from the surroundings, wherein one inlet opening is arranged in a connecting region of the first wall region to the fourth wall region, one inlet opening is arranged in a connecting region of the second wall region to the fourth wall region and one inlet opening is arranged in the wall in the region of the extraction region.

In order to achieve advantageous suction attachment of the suction-attachment device on a wall or the floor in a structurally easy way, a sealing element or a number of sealing elements may be provided, connected to the wall on a side facing away from the cover, in particular around the periphery. The sealing element or the sealing elements are preferably designed in such a way that, in a position of the suction-attachment device sucked against a wall or a floor, they seal the extraction channel with respect to the wall or the floor.

In order to achieve favorable handling of the extraction device, the housing may have a connecting device for the attachment of a holding device for the extraction device. By means of the holding device, for example a handle, the extraction device can be manually moved, for example for receiving drilling water.

Further advantages will become apparent from the following description of the figures. An exemplary embodiment of the present invention is depicted in the figures. The figures, the description and the claims contain numerous features in combination. A person skilled in the art will expediently also consider the features individually and combine them to form useful further combinations.

BRIEF DESCRIPTION OF THE DRAWINGS

In the figures, components that are the same and components of the same type are designated by the same reference signs.

In the figures.

DETAILED DESCRIPTION

Figure 1:
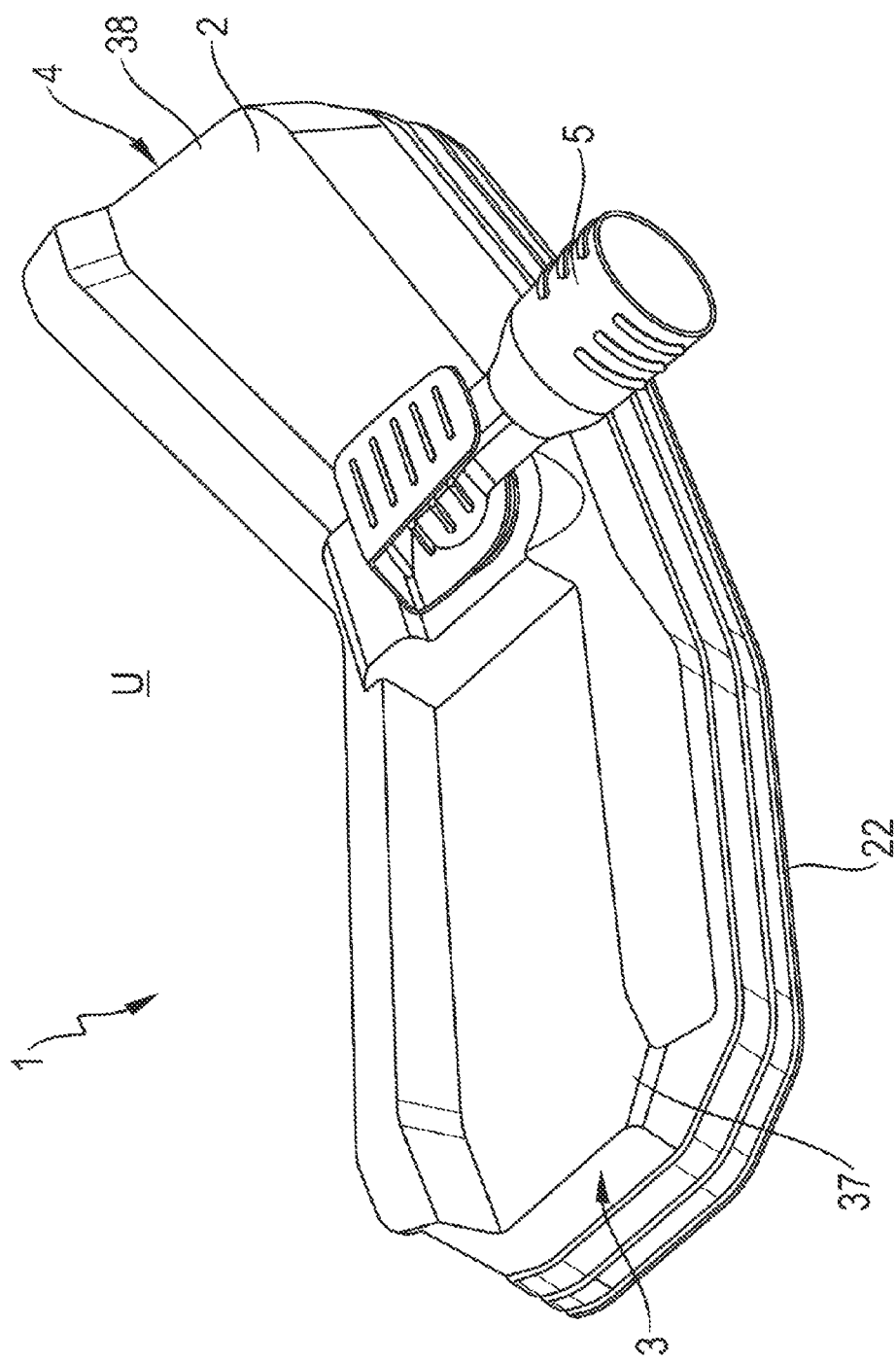
FIG. 1 shows a three-dimensional view of an extraction device, wherein sealing elements that are provided for interacting with a base material can be seen in the form of details.

FIG. 1 to FIG. 14 show an extraction device 1, which is intended for interacting with a core drill. The extraction device 1 has a housing 4, which is designed with a cover 2 and a wall 3 and altogether has the shape of a V. The extraction device 1 is designed in the present case as substantially symmetrical in relation to a longitudinal center plane 6 (see, e.g., FIG. 3), wherein an extraction nozzle 5 is connected to the cover 2 in a central region. The connection nozzle is provided for connecting the extraction device 1 to a suction device or a dust collector, by means of which a negative pressure can be generated in a cavity 7 of the extraction device 1 that can be seen for example in FIG. 4.

Figure 8:
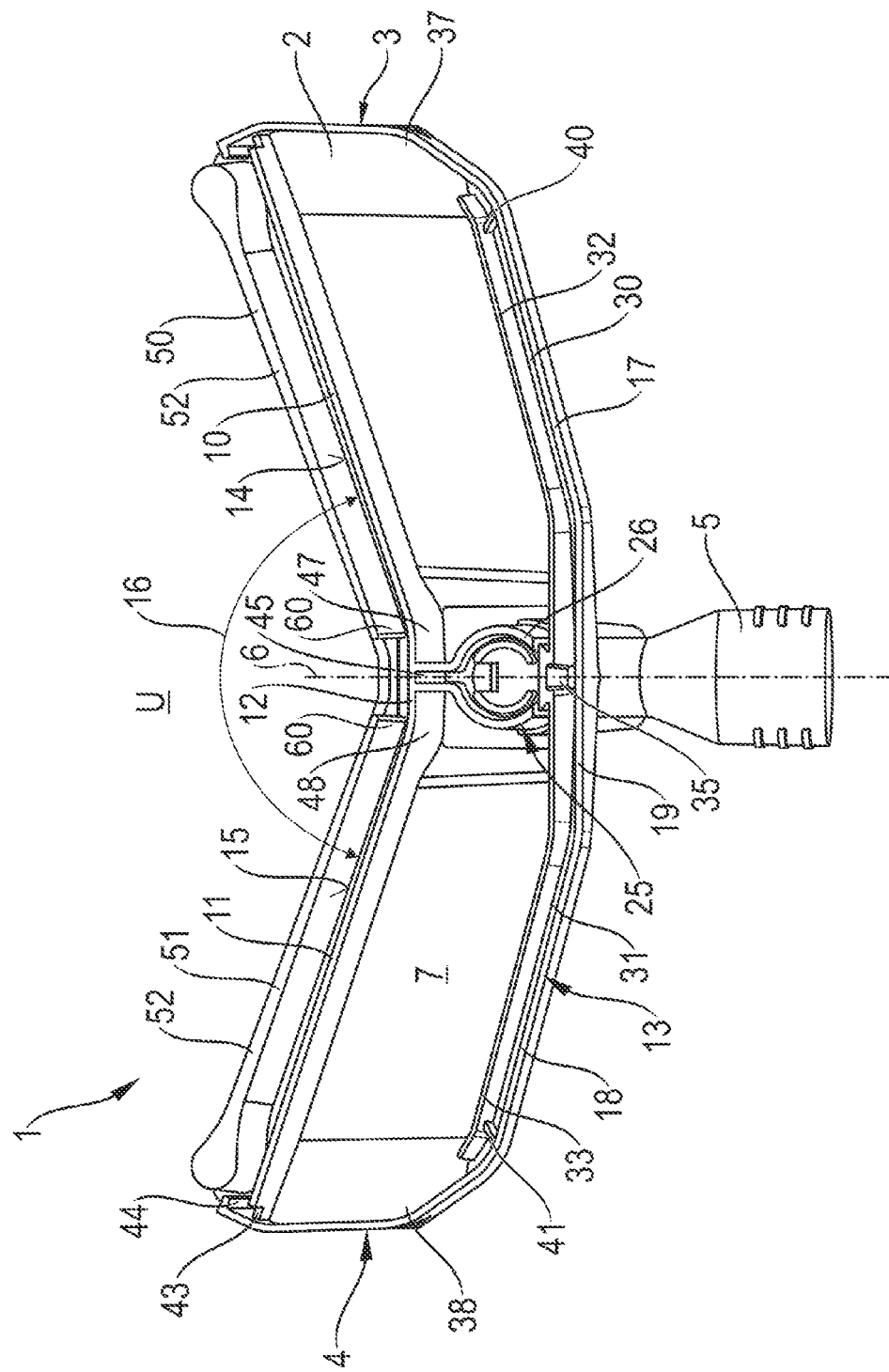
FIG. 8 shows a view corresponding to FIG. 7 of the extraction device according to FIG. 1, wherein the sealing elements are not shown.
Figure 9:
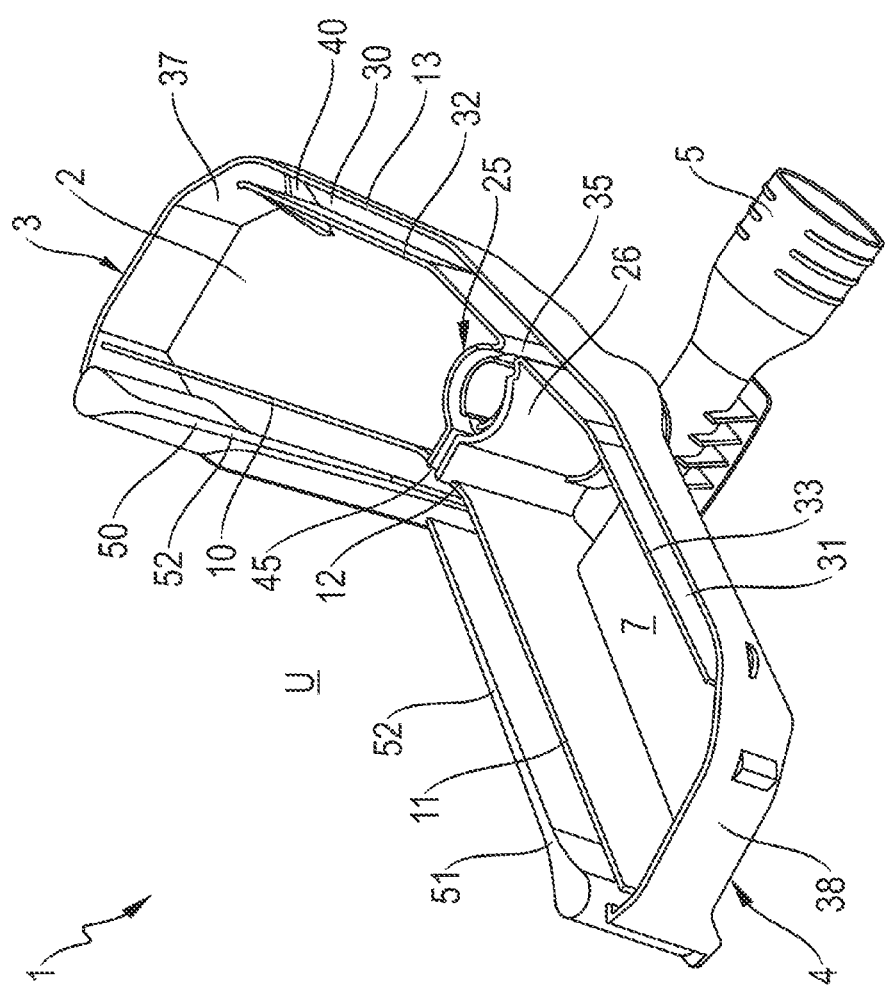
FIG. 9 shows a three-dimensional view of the extraction device according to FIG. 1 from below, wherein the sealing devices are not shown.
Figure 10:
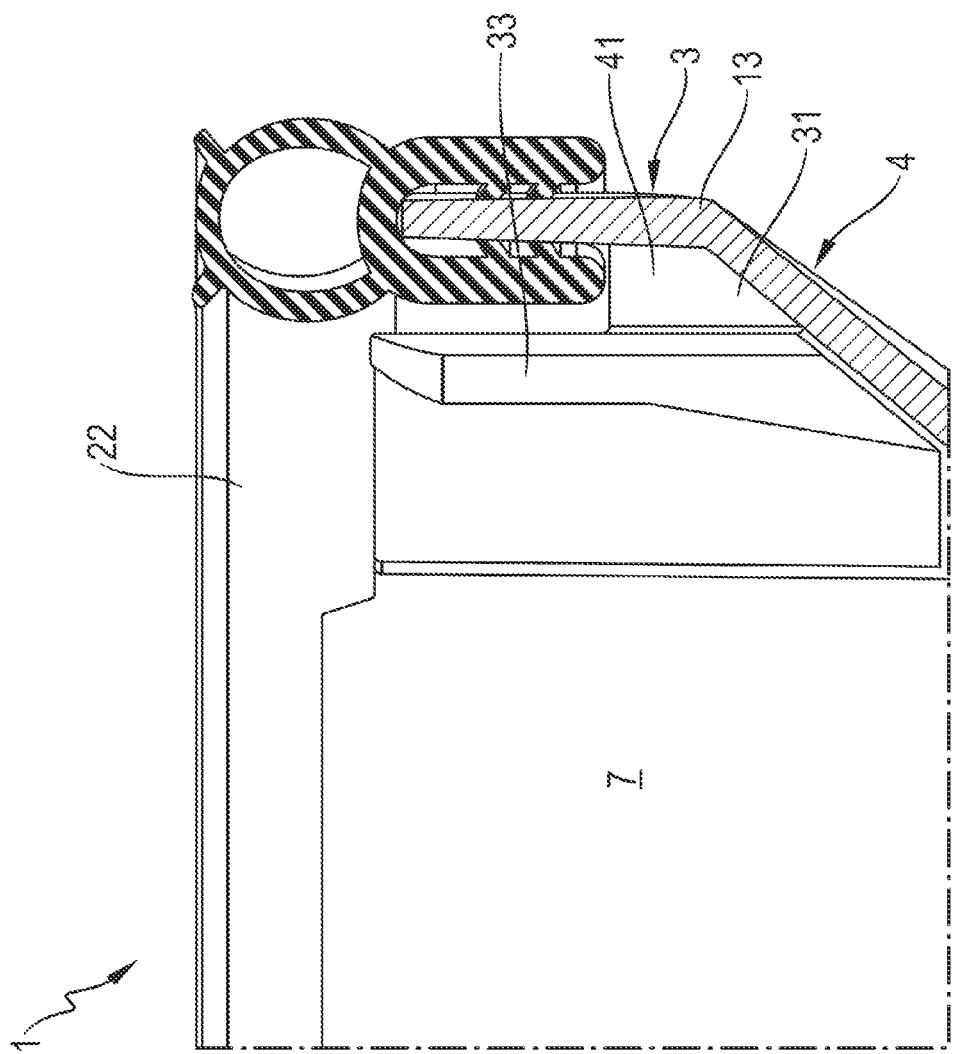
FIG. 10 shows a sectional view of the extraction device according to FIG. 1 with the sealing elements, wherein an extraction channel can be seen more specifically.

As can be seen more specifically for example in FIG. 8, the wall 3 is in the present case arranged substantially perpendicularly to the cover 2 and connected to the cover 2 around the periphery. The wall 3 has in this case a first wall region 10, a second wall region 11, a third wall region 12 and a fourth wall region 13. The first wall region 10, the second wall region 11 and the third wall region 12 are in the present case substantially planar, wherein the first wall region 10 is connected to the third wall region 12 and the second wall region 11 is connected to the third wall region 12 in a peripheral region of the third wall region 12 that is facing away from the region of attachment of the first wall region 10 to the third wall region 12. A surface 14 of the first wall region 10 that is facing away from the cavity 7 forms an obtuse angle 16, which in the present case is approximately 140°, with a surface 15 of the second wall region 11 that is facing away from the cavity 7.

The fourth wall region 13 is U-shaped or crescent-shaped, wherein the fourth wall region 13 has substantially planar portions 17, 18, 19 respectively running substantially parallel to the first wall region 10, the second wall region 11 and the third wall region 12. The fourth wall region 13 is connected in a peripheral region to a peripheral region of the first wall region 10 that is facing away from the third wall region 12 and is connected in a further peripheral region to a peripheral region of the second wall region 11 that is facing away from the third wall region 12.

Figure 7:
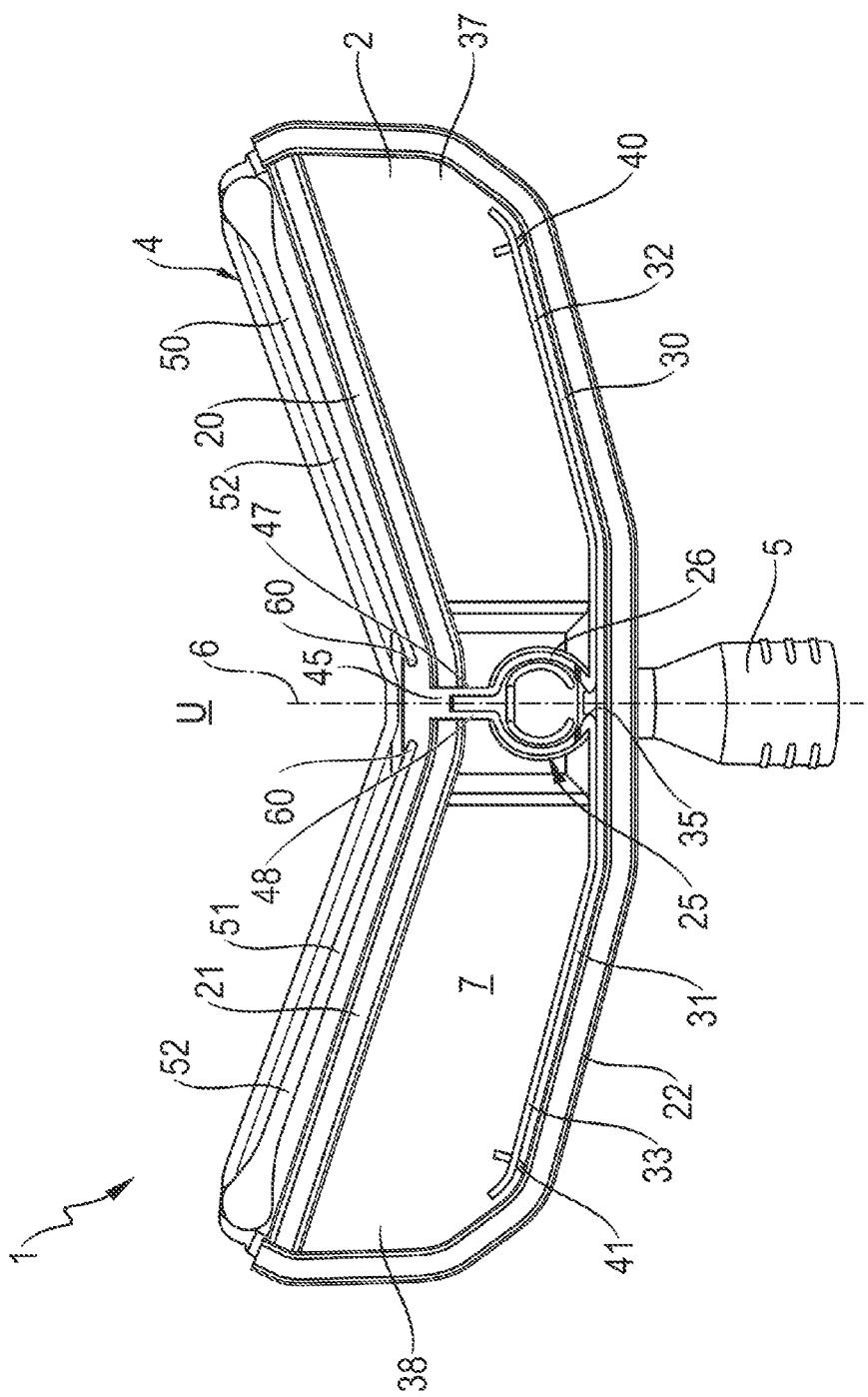
FIG. 7 shows a view of the extraction device according to FIG. 1 from below, with sealing devices arranged in the inoperative position.

As can be seen for example in FIG. 7 and FIG. 8, arranged in a peripheral region of the wall 3 that is facing away from the cover 2 in the present case are three sealing elements 20, 21, 22, which are connected to the wall 3 almost completely around the periphery and can be fitted on the respective region 10, 11, 12 or 13 of the wall 3. The first sealing element 20 is in this case connected to the first wall region 10 and has substantially a longitudinal extent comparable to the first wall region 10. The second sealing element 21 is connected to the second wall region 11 and has substantially a longitudinal extent comparable to the second wall region 11. By contrast, the third sealing element 22 is connected to the fourth wall element 13 and has substantially a longitudinal extent comparable to the third wall region 13.

In the cavity 7 there is also arranged an extraction region 25, which is formed here with a wall 26 that is cylindrical in certain regions, wherein the wall 26 is connected to the cover 2. The wall 26 has an extent in terms of height such that, in an operating state in which the extraction device 1 is held on the base material, the wall 26 is preferably directly in contact with the base material. Consequently, in particular in the operating state of the extraction device 1, on a side facing the base material, all of the sealing elements 20, 21, 22 and the wall 26 of the extraction region 25 lie substantially in one plane. In the operating state of the extraction device 1, the extraction device 1 is held against the base material, for example a floor or a wall, by a negative pressure generated in the cavity 7 by the suction device, preferably without any further holding device.

Also provided in the present case are two extraction channels 30, 31, which are formed by the fourth wall region 13 and respectively a fifth wall region 32, running substantially parallel to the fourth wall region 13, and a sixth wall region 33, running substantially parallel to the fourth wall region 13. A distance between the fourth wall region 13 and the fifth wall region 32 and a distance between the fourth wall region 13 and the sixth wall region 33 is constant, in particular over almost the entire extent of the extraction channels 30, 31, and in the present case is approximately 6 mm. The fifth wall region 32 and the sixth wall region 33 are in this case designed in the form of panels and are respectively connected to the cover 2. These wall regions 32 and 33 have an extent in terms of height such that, in the operating state of the extraction device 1, they come into contact with the sealing element 22, so that the respective extraction channel 30 or 32 is sealed by the sealing element 22 on a side facing away from the cover 2.

As can be seen for example in FIG. 8, the fifth wall region 32 and the sixth wall region 33 are respectively connected to the wall 26 of the extraction region 25, which has a clearance 35 in the region of the longitudinal center plane 6, so that the respective extraction channel 30, 31 is directly in contact with the extraction region 25. The fifth wall region 32 extends from the extraction region 25 substantially parallel to the fourth wall region 13 into a first peripheral region 37 of the housing 4 that is facing away from the longitudinal center plane 6. Similarly, the sixth wall region 33 extends from the extraction region 25 substantially parallel to the fourth wall region 13 into a second peripheral region 38 of the housing that is opposite from the first peripheral region 37 with respect to the longitudinal center plane 6.

Both in the first extraction channel 30 and in the second extraction channel 31, an element 40 or 41 that narrows or reduces the size of the flow cross section of the respective extraction channel 30 or 31 in the region of the element 40 or 41 is arranged in the present case in a region of the respective extraction channel 30 or 31 that is facing the first peripheral region 37 or the second peripheral region 38, respectively. In the region of the element 40 or 41, the extraction channel 30 or 31 has a width of preferably 2 mm to 3 mm, in particular approximately 2.5 mm, and a height of preferably 10 mm to 20 mm, in particular approximately 15 mm, so that the extraction channel 30 or 31 has in this region a cross section of 20 mm$^2$ to 60 mm$^2$, in particular of approximately 37.5 mm$^2$. In the operative position of the extraction device 1, a cross section of the extraction channel 30 or 31 through which a flow can pass is laterally bounded in the region of the respective element 40 or 41 by the fifth wall element 32 or the sixth wall element 33, respectively, and the third sealing element 22 (see, e.g., FIG. 7). On the other hand, the cross section of the extraction channel 30 or 31 through which a flow can pass is bounded perpendicularly thereto, in the vertical direction, on the one hand by the respective element 40 or 41 and on the other hand by the third sealing element 3, which seals the extraction channel 30 or 31 in the operative position of the extraction device 1 on an opposite side. It can be easily ensured by an appropriate cross-sectional design of the extraction channel 30 or 31 that for example drilling water located in the cavity 7 is removed from the cavity 7, in particular completely, by way of the extraction channel 30 or 31 and the extraction region 25.

Figure 11:
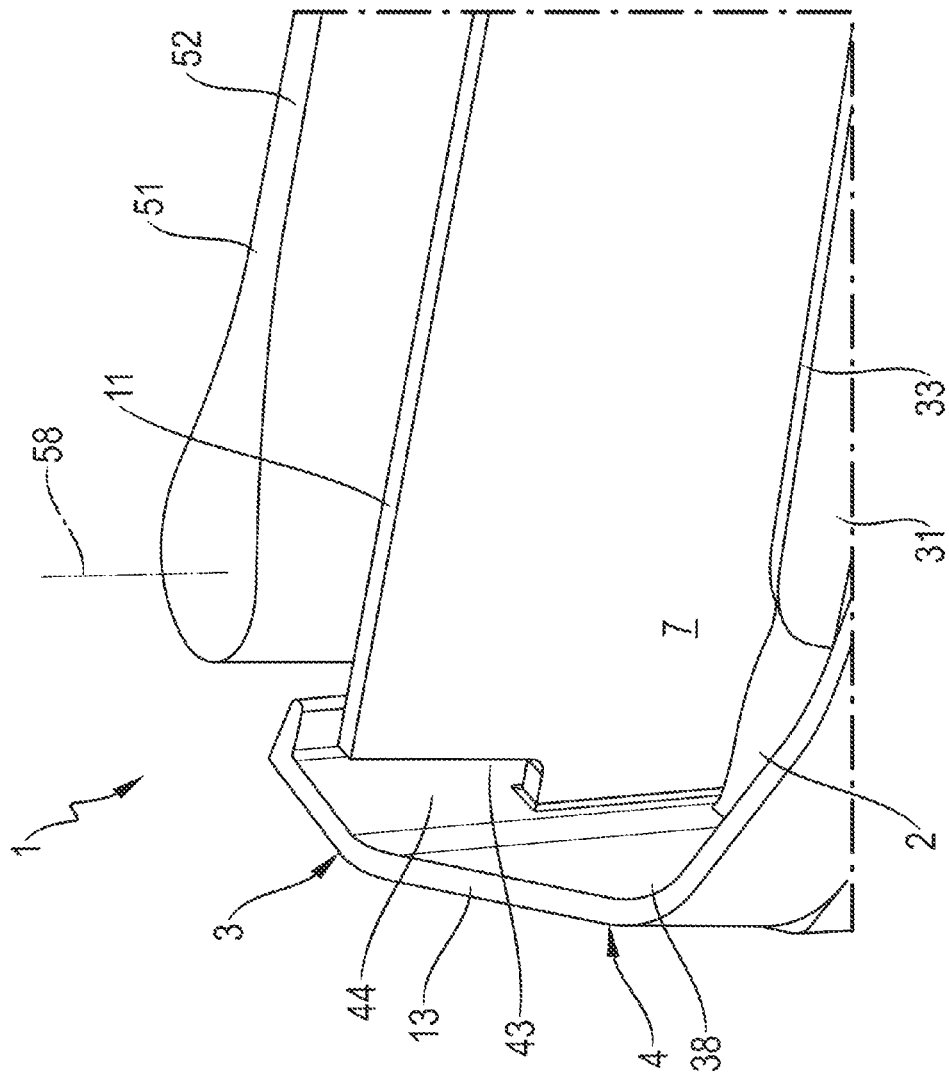
FIG. 11 shows a three-dimensional view of a detail of the extraction device according to FIG. 1 without the sealing elements, wherein an inlet opening that is arranged in a wall of the housing can be seen more specifically.
Figure 12:
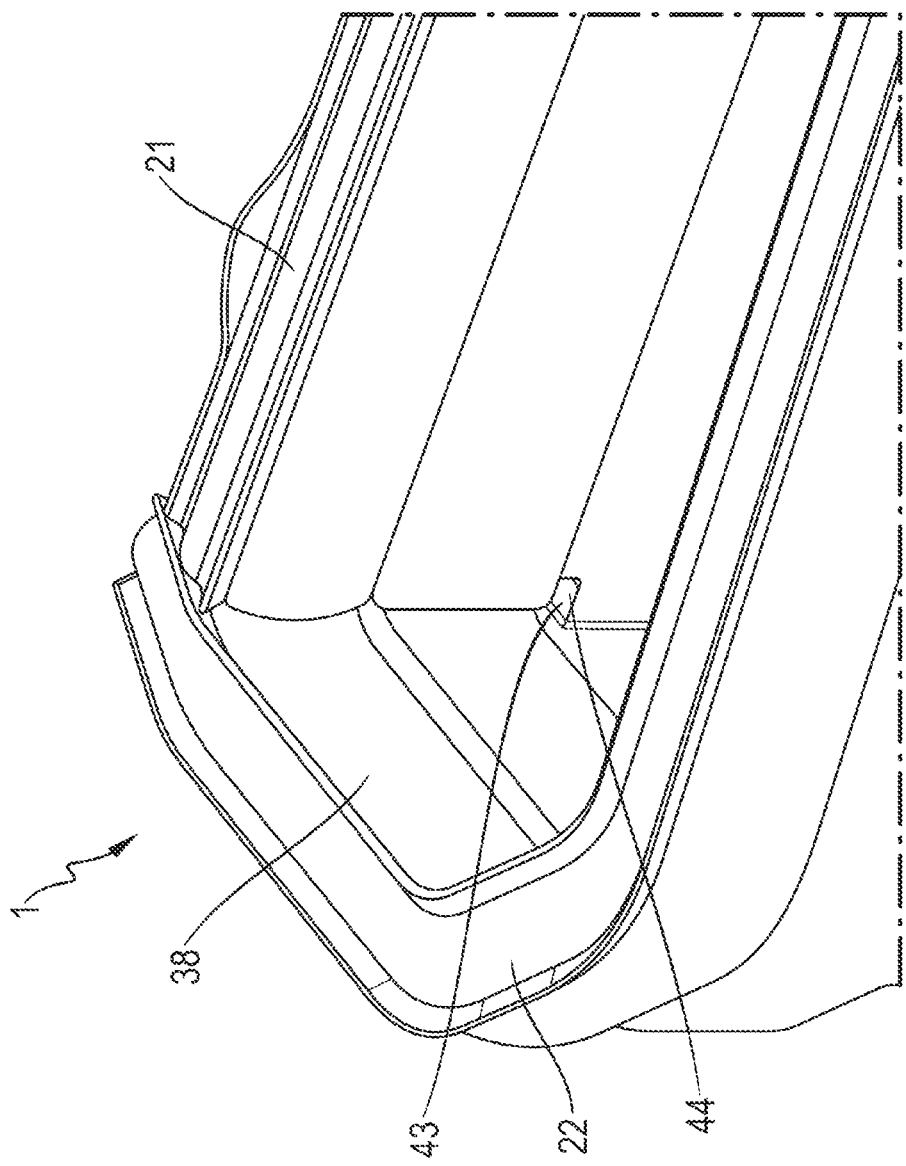
FIG. 12 shows a view corresponding to FIG. 11 of the extraction device according to FIG. 1 with the sealing elements.

As can be seen more specifically in FIG. 11 and FIG. 12, an inlet opening 44, by way of which drilling water can be fed from the surroundings U (see, e.g., FIG. 4) to the cavity 7 in the operative position of the extraction device 1, is formed in an abutting region of the fourth wall region 13 adjacent to the first wall region 10 by a clearance 43 in the first wall region 10. In FIG. 12 it can be seen that the inlet opening 44 is arranged substantially underneath the first sealing element 20. Comparable to the inlet opening 44, an inlet opening formed by a clearance in the second wall region 11 is provided in the opposite peripheral region of the housing 4.

Figure 13:
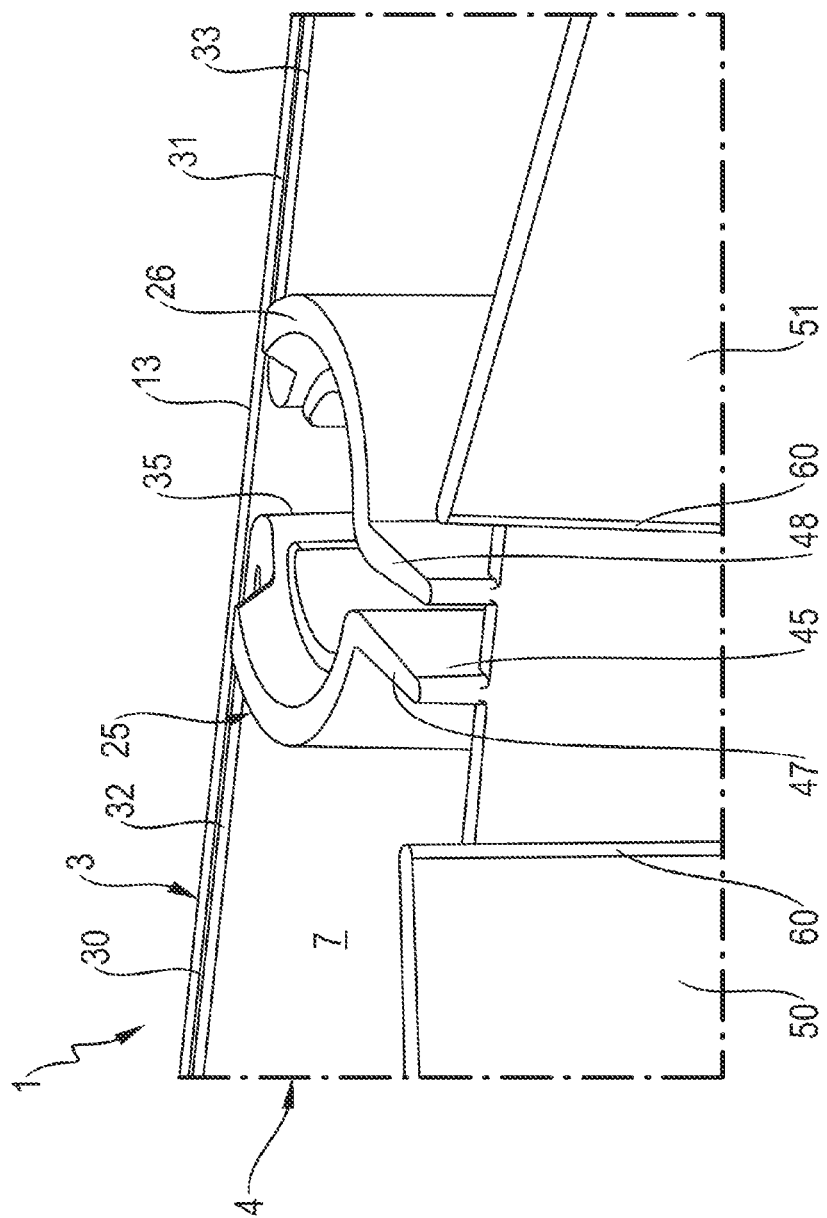
FIG. 13 shows a three-dimensional view of a detail of the extraction device according to FIG. 1 without the sealing elements, wherein a further inlet opening that is arranged in the wall of the housing can be seen more specifically.
Figure 14:
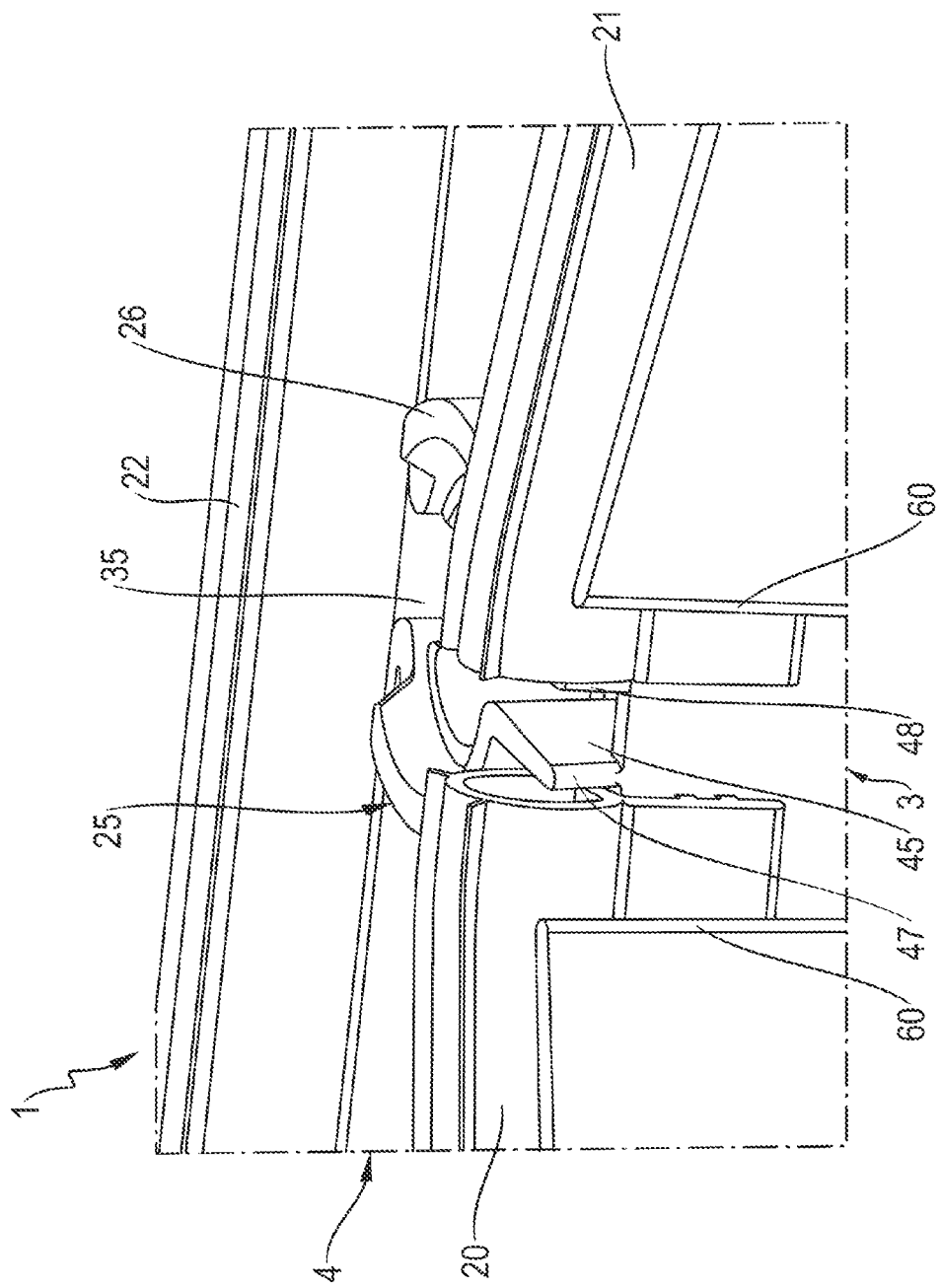
FIG. 14 shows a view corresponding to FIG. 13 of the suction device according to FIG. 1 with the sealing elements.

Shown in FIG. 13 and FIG. 14 is a further inlet opening 45, which is formed by two substantially parallel wall regions 47 and 48 of the wall 26 of the extraction region 25 at a distance between the first sealing element 20 and the second sealing element 21. Through the further inlet opening 45, drilling water that is fed in for example from the surroundings U (see, e.g., FIG. 4) can be passed directly into the extraction region 25.

In the operative position of the extraction device 1, both the inlet openings 44 and the further inlet opening 45 are in particular directly adjacent to the base material, so that drilling water can be easily introduced into the cavity 7 through the inlet openings 44, 45.

As shown more specifically for example in FIG. 2 to FIG. 6, the extraction device 1 has in the present case two sealing devices 50, 51, which are mounted on the housing 4 in each case pivotably about a pivot axis 57 or 58, respectively. The sealing devices 50, 51, designed for example as sealing strips, are in the present case in the form of panels and are made from an elastic and flexible material, for example rubber, and are respectively mounted on a side of the first wall region 10 or the second wall region 11 that is facing away from the cavity 7. For this purpose, a cylindrical fitting 54 or 55 is respectively arranged on the housing 4 in the form of a holding pin, on which the respective sealing device 50, 51 is fitted by a corresponding cylindrical recess 56 or 57. An inside diameter of the recess 56 or 57 is in this case preferably smaller than an outside diameter of the fitting 54 or 55, so that the sealing device 50 or 51 is securely held in the position applicable at the time in each case.

Figure 2:
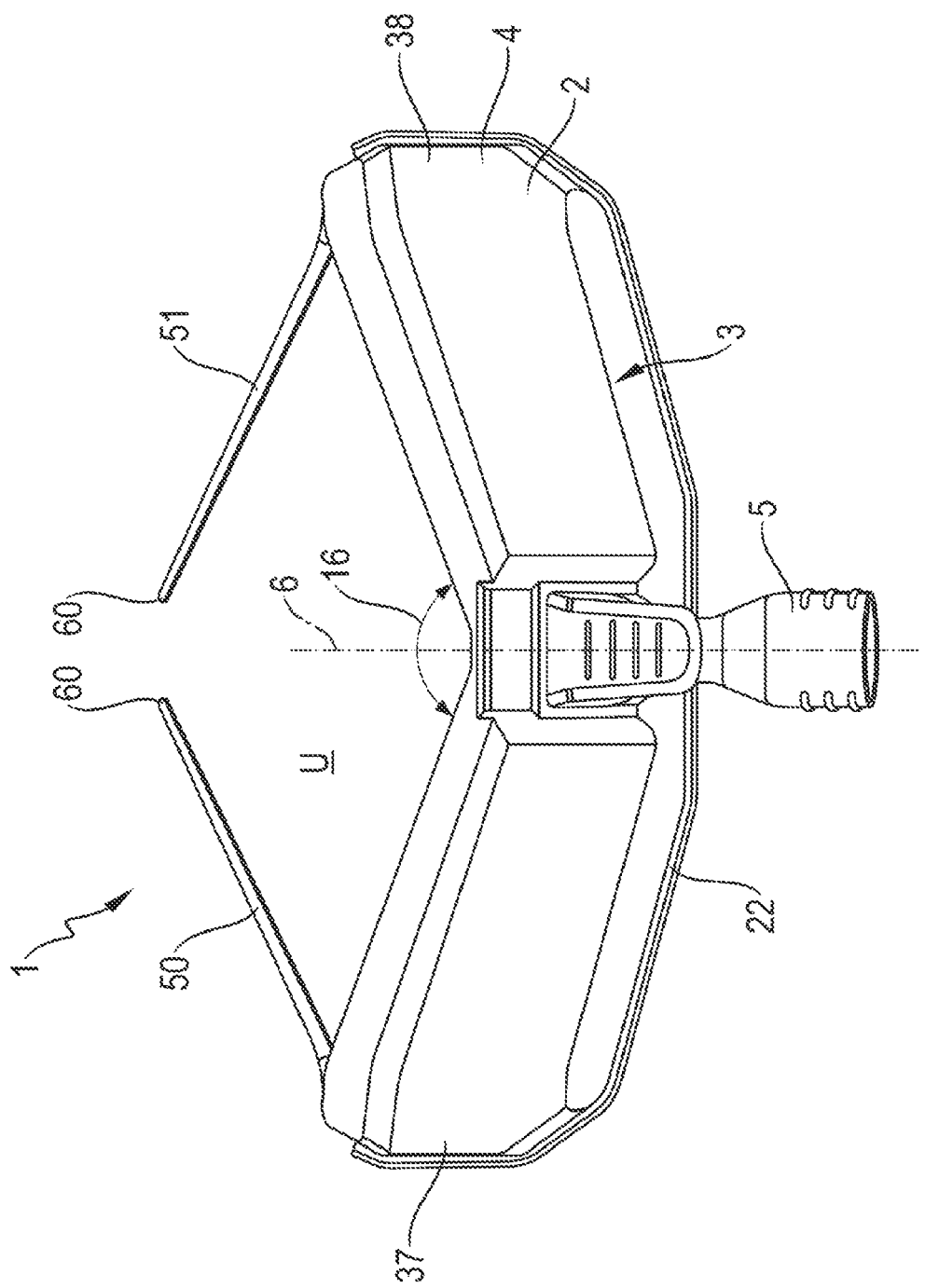
FIG. 2 shows a plan view of the extraction device according to FIG. 1, wherein sealing devices are arranged in an operative position that is partially pivoted with respect to an inoperative position.
Figure 3:
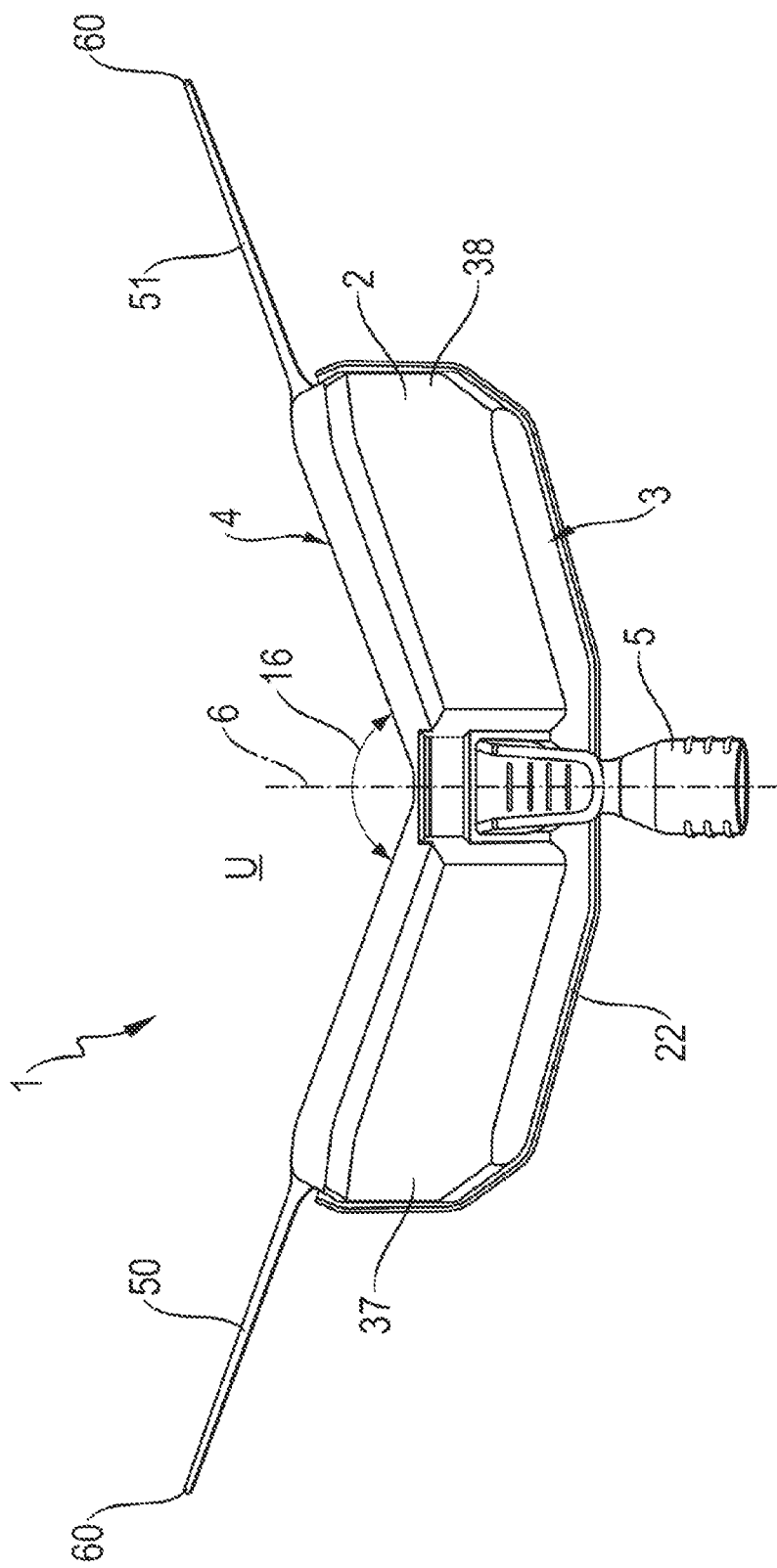
FIG. 3 shows a plan view of the extraction device according to FIG. 1, wherein sealing devices are arranged in an operative position that is completely pivoted with respect to the inoperative position.
Figure 4:
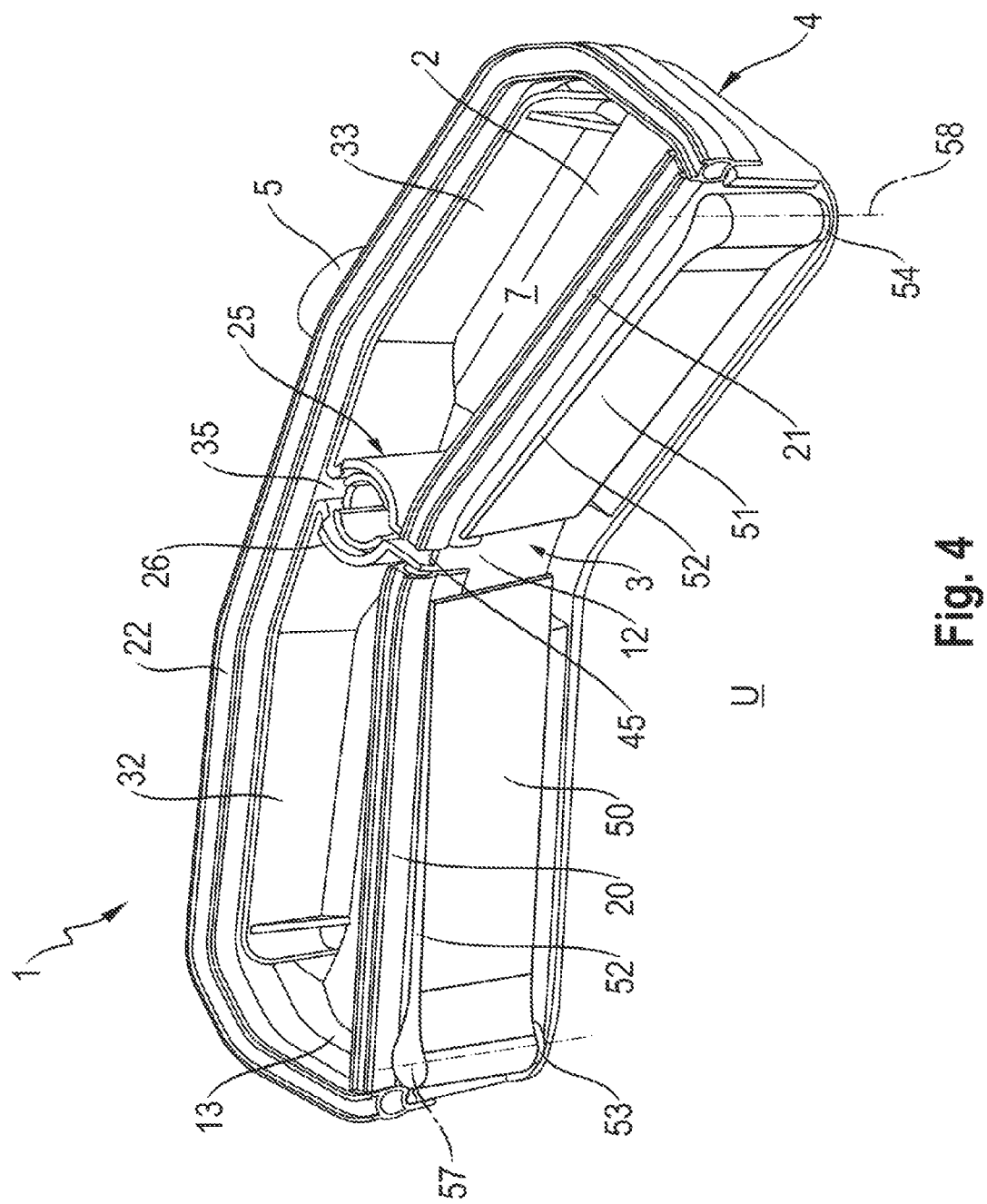
FIG. 4 shows a three-dimensional view of the extraction device according to FIG. 1 from below, wherein the sealing devices are arranged in the inoperative position.
Figure 5:
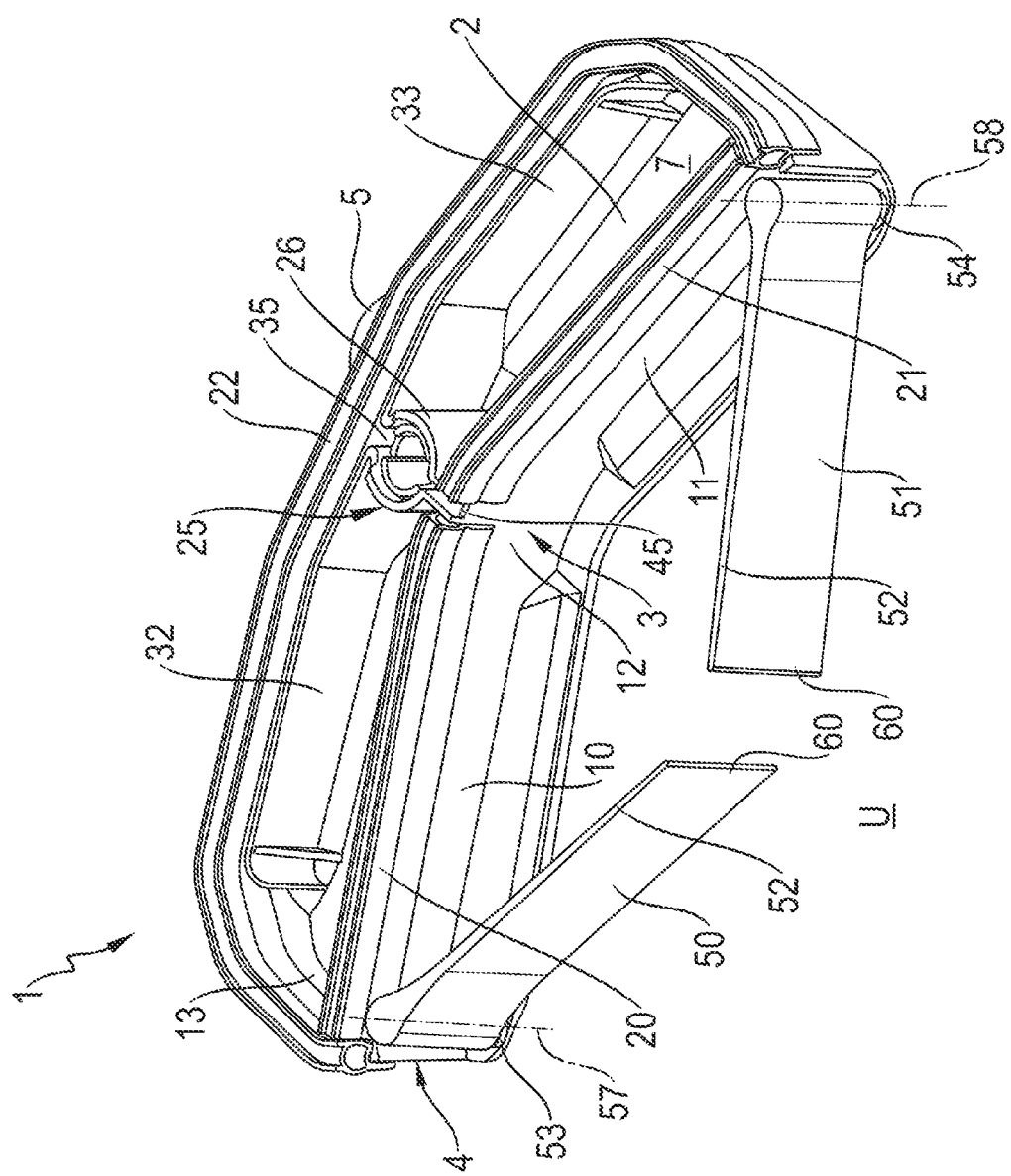
FIG. 5 shows a view corresponding to FIG. 4 of the extraction device according to FIG. 1, wherein the sealing devices are arranged in a partially pivoted operative position.
Figure 6:
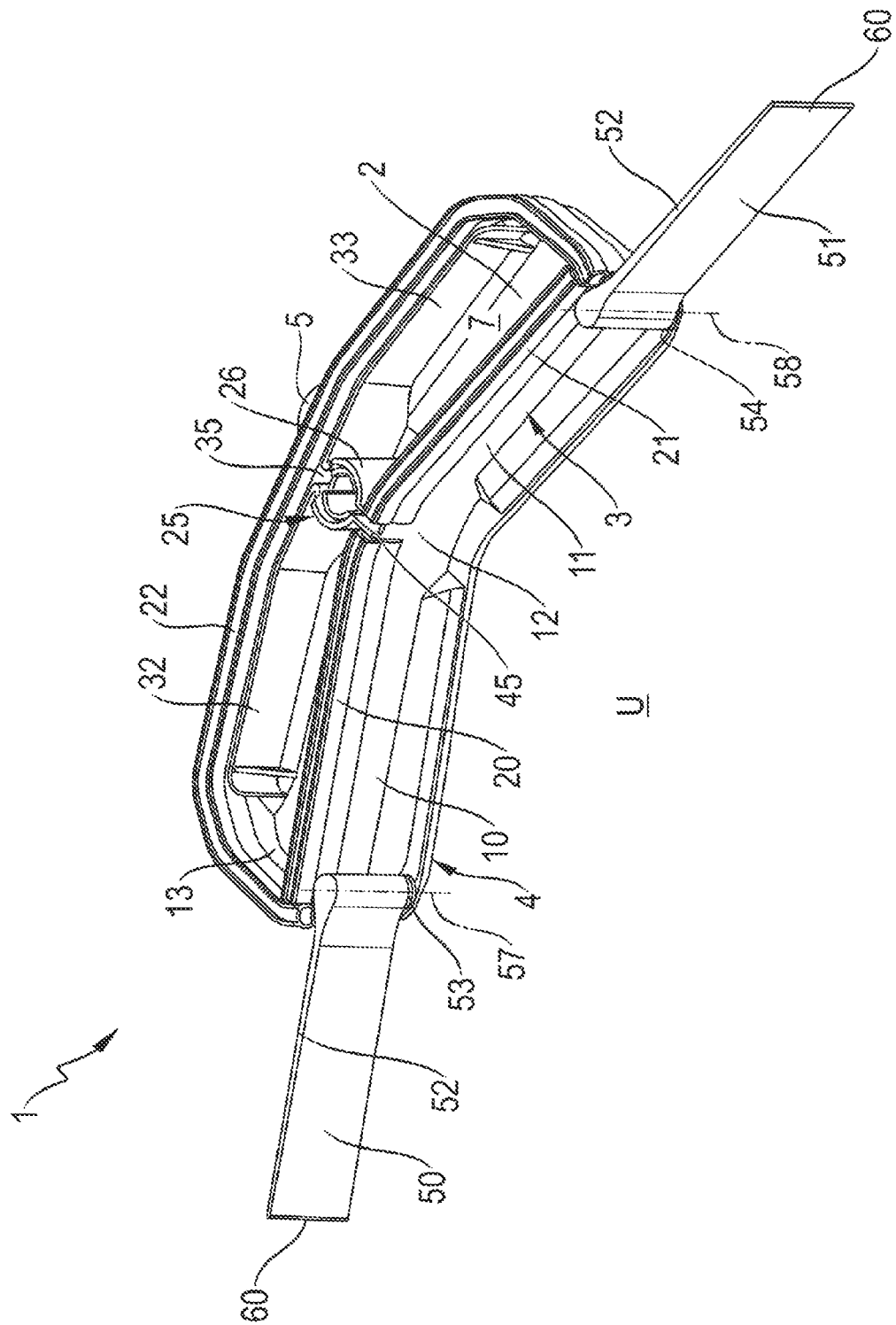
FIG. 6 shows a view corresponding to FIG. 4 of the extraction device according to FIG. 1, wherein the sealing devices are arranged in the completely pivoted operative position.

The respective sealing device 50 or 51 can be adjusted between the inoperative position, which is shown for example in FIG. 4 and in which the sealing device 50 or 51 is arranged substantially parallel to the wall region 10 or 11, and various operative positions according to FIG. 2 and FIG. 3. The sealing devices 50 or 51 can in this case be pivoted independently of one another in the present case with respect to the inoperative position, by an angle of approximately 180° about the pivot axis 57 or 58. In the inoperative position, the extraction device 1 takes up an advantageously small installation space.

On a side 52 that is facing a base material in the operative position of the extraction device 1, the sealing devices 50 or 51 are angled, wherein a peripheral region 60 that is facing away from the respective fitting 53 or 54 has in an inoperative position of the extraction device 1 a greater extent in the direction of a direction interacting with a base material in the operative position than a region that is facing the fitting 53 or 54. As a result, a sealing contact of the sealing device 50 or 51 against the base material is ensured in the operative position of the extraction device by a large achievable surface pressure. Furthermore, such a design of the sealing devices 50 or 51 allows unevennesses of a base material and tolerance variations to be compensated.

The extraction device 1 is intended for interacting with a core drill, for example a diamond drill, wherein the extraction device 1 may be designed as a holding aid for the extraction device 1. The V-shaped design of the first wall region 10 with respect to the second wall region 11 has the effect that the extraction device 1 can preferably be arranged underneath a drill bit of the core drill, in particular directly adjacent to the drill bit, so that drilling water spun off during core drilling can be received by the extraction device 1, in particular completely. An appropriate setting of the sealing devices 50 or 51 makes it easily achievable that a particularly large proportion of the drilling water spun off from the drill is fed to the extraction device 1. An effective width of the extraction device 1 can be easily increased by the sealing devices 50 or 51 in the operative position. Furthermore, sealing can be obtained by means of the sealing devices 50 or 51 in the operative position, preferably with respect to a side wall arranged perpendicularly in relation to the wall to be machined.

If the extraction device 1 is connected by means of the extraction nozzle 5 to a suction device or a dust collector, a negative pressure is produced in the cavity 7 when the extraction device 1 is arranged on a base material, in particular a wall, by which the extraction device 1 is held firmly and securely against the base material. The negative pressure in the cavity 7 and the gravitational force have the effect that the drilling water is sucked into the cavity 7 through the inlet openings 44 or the further inlet opening 45 and is removed from the cavity 7 by way of the extraction region 25 and the extraction nozzle 5.

The shallow V shape of the housing 4 of the extraction device 1 has the effect that an angular range of the extraction device 1 in an arrangement of the extraction device 1 on a wall, in which the third wall region is arranged at a lower level than the first wall region 10 and the second wall region 11, is relatively small. In this case, the drilling water is fed directly to the extraction region 25 through the further inlet opening 44 or is passed through the portions 17 and 18 of the fourth wall region 13, which are designed to be substantially parallel to the first wall region 10 and the second wall region 11, by gravitational force in the direction of the extraction region 25.

In the operative position of the extraction device 1, it may be provided that the extraction device is arranged skewed in such a way that the first wall region 10 or the second wall region 11 is arranged with a region that is facing the peripheral region 37 or 38 of the housing 4 lower than a region that is facing the longitudinal center plane 6. In this case, drilling water would collect in a lateral peripheral region of the cavity 7 under the effect of gravitational force alone. The provision of the extraction channels 30, 31 ensures that even in this case drilling water is removed from the cavity 7, in particular almost completely. As a result, contamination of the wall after removal of the extraction device 1 from the wall can be prevented.

LIST OF REFERENCE SIGNS

1 Extraction device
2 Cover
3 Wall
4 Housing
5 Extraction nozzle
6 Longitudinal center plane
7 Cavity
10 First wall region
11 Second wall region
12 Third wall region
13 Fourth wall region
14 Surface of the first wall region
15 Surface of the second wall region
16 Angle
17 Portion of the fourth wall region
18 Portion of the fourth wall region
19 Portion of the fourth wall region
20 First sealing element
21 Second sealing element
22 Third sealing element
25 Extraction region
26 Wall
30 First extraction channel
31 Second extraction channel
32 Fifth wall region
33 Sixth wall region
35 Clearance
37 First peripheral region of the housing
38 Second peripheral region of the housing
40 Element
41 Element
43 Clearance
44 Inlet opening
45 Further inlet opening
47 Wall region
48 Wall region
50 First sealing device
51 Second sealing device
52 Side
53 Fitting
54 Fitting
55 Recess
56 Recess
57 Pivot axis
58 Pivot axis
60 Peripheral region
U Surroundings

What is claimed is:

1. An extraction device for a core drill, the extraction device comprising:
a housing having at least one cavity, a cover and a wall connected to the cover around a periphery of the cover;
an extraction nozzle connected to the housing, the extraction nozzle for attaching the extraction device to a suction device;
the wall having at least one inlet opening, the cavity being connected to surroundings of the extraction device via the at least one inlet opening; and
a seal device movable between an inoperative position, lying against the wall of the housing, and an operative position, pivoted with respect to the inoperative position about a pivot axis so as not to lie against the wall of the housing, the seal device being connected to the housing on a side of the wall facing away from the cavity.

2. The extraction device as recited in claim 1 wherein the seal device is pivotable 180° between the inoperative position and the operative position.

3. The extraction device as recited in claim 1 wherein the seal device is made from a flexible material.

4. The extraction device as recited in claim 1 wherein the seal device is fixedly or detachably connected to the housing.

5. The extraction device as recited in claim 1 wherein the housing has a cylindrical fitting and the seal device has a cylindrical recess corresponding to the cylindrical fitting.

6. The extraction device as recited in claim 5 wherein an inside diameter of the cylindrical recess is smaller than an outside diameter of the cylindrical fitting.

7. The extraction device as recited in claim 5 wherein a side of the seal device facing the wall or a floor in the operative position of the extraction device is angled away from the cylindrical fitting.

8. The extraction device as recited in claim 1 wherein the extraction device has a longitudinal center plane and the cover extends laterally from the longitudinal center plane, and the seal device is attached to the housing in a lateral peripheral region of the extraction device.

9. The extraction device as recited in claim 1 wherein the extraction device has a longitudinal center plane and the cover extends laterally from the longitudinal center plane, and the seal device includes two seals attached to the housing at opposite lateral ends.

10. The extraction device as recited in claim 1 wherein the wall has a first planar wall region and a second planar wall region, a surface of the first wall region facing away from the cavity forming an obtuse angle with a further surface of the second wall region facing away from the cavity.

11. The extraction device as recited in claim 10 wherein the first wall region and the second wall region are connected to one another by a third wall region.

12. The extraction device as recited in claim 11 wherein the third wall region is planar.

13. The extraction device as recited in claim 10 wherein the wall has a further wall region connected to the first wall region and to the second wall region.

14. The extraction device as recited in claim 13 wherein the further wall region is crescent-shaped or U-shaped.

15. The extraction device as recited in claim 1 further comprising an extraction region arranged in the cavity and connecting the extraction nozzle to the cavity.

16. The extraction device as recited in claim 15 wherein the extraction region is cylindrical.

17. The extraction device as recited in claim 13 further comprising an extraction channel formed by the further wall region and a yet further wall region arranged parallel to the further wall region.

18. The extraction device as recited in claim 13 wherein the housing has three inlet openings, a first of the inlet openings arranged in a connecting region of the first wall region to the further wall region, a second of the inlet openings is arranged in a further connecting region of the second wall region to the further wall region and a third of the inlet openings is arranged in the wall in a region of an extraction region arranged on the cavity.

19. The extraction device as recited in claim 1 wherein the wall is extends perpendicularly from the cover and further comprising at least one seal element different from the seal device and connected to an edge of the wall facing away from the cover.

20. The extraction device as recited in claim 19 wherein the at least one seal element is located around the periphery of the cover.

21. The extraction device as recited in claim 1 further comprising a pin on the housing defining the pivot axis, the sealing device pivoting on the pin.

* * * * *